(12) United States Patent
Poloni et al.

(10) Patent No.: US 7,925,228 B2
(45) Date of Patent: Apr. 12, 2011

(54) METHOD AND SYSTEM FOR CALIBRATING QUADRATURE MODULATORS

(75) Inventors: Angelo Poloni, Fino Del Monte (IT); Stefano Valle, Milan (IT)

(73) Assignee: STMicroelectronics, S.r.l., Agrate Brianza (IT)

( * ) Notice: Subject to any disclaimer, the term of this patent is extended or adjusted under 35 U.S.C. 154(b) by 607 days.

(21) Appl. No.: 12/040,690

(22) Filed: Feb. 29, 2008

(65) Prior Publication Data

US 2009/0221246 A1 Sep. 3, 2009

(51) Int. Cl.
*H03C 1/62* (2006.01)
*H04L 27/36* (2006.01)

(52) U.S. Cl. .................. 455/115.1; 455/115.2; 375/298

(58) Field of Classification Search ............... 455/67.11, 455/67.14, 115.1, 115.2, 115.3; 375/295, 375/296, 298
See application file for complete search history.

(56) References Cited

U.S. PATENT DOCUMENTS

| | | | | |
|---|---|---|---|---|
| 6,704,551 B2 * | 3/2004 | Riou et al. | ................. | 455/115.1 |
| 6,771,709 B2 * | 8/2004 | Huang et al. | ................. | 375/296 |
| 7,307,666 B2 * | 12/2007 | Wu et al. | ....................... | 348/473 |
| 7,548,591 B2 * | 6/2009 | Parsa et al. | .................... | 375/298 |
| 7,734,261 B2 * | 6/2010 | Bury | .......................... | 455/115.1 |

OTHER PUBLICATIONS

Cavers, J. K., "New Methods for Adaption of Quadrature Modulators and Demodulators in Amplifier Linearization Circuits," Transaction on Vehicular Technology, vol. 46, No. 3, Aug. 1997, pp. 707-716.

Craninckx, Jan; Debaillie, Bjorn; Come, Boris; Donnay, Stephane, "A WLAN Direct Upconversion Mixer with Automatic Calibration," 2005 IEEE International Solid-State Circuits Conference, Session 29, RF Techniques, 29.9, 0-7803-8904-2/05, Feb. 9, 2005, pp. 546-547 and 618.

* cited by examiner

*Primary Examiner* — Sonny Trinh
(74) *Attorney, Agent, or Firm* — Lisa K. Jorgenson; Kevin D. Jablonski; Graybeal Jackson LLP

(57) ABSTRACT

A calibration method and system for reducing modulation errors in a telecommunication transmitter apparatus includes providing a pair of test signals, which are substantially in quadrature to each other, and to repeat an estimation loop. The estimation loop starts with generating a modulated signal by modulating the test signals (the modulation introducing a modulation error) and continues by obtaining a squared signal corresponding to the square of the modulated signal. A transformed signal corresponding to the squared signal in the frequency domain is then calculated. The estimation loop further includes calculating an error indicator, indicative of the modulation error, according to the modulus of the transformed signal. A compensation, to be applied to the test signals for counterbalancing the modulation error, is calculated according to the error indicator and is then applied to the test signals. The estimation loop is repeated until the error indicator reaches a threshold and an indication of the compensation resulting from a last iteration of the estimation loop is stored (for the application of the compensation to each pair of operative signals managed by the telecommunication transmitter apparatus during operation thereof).

16 Claims, 4 Drawing Sheets

METHOD AND SYSTEM FOR CALIBRATING QUADRATURE MODULATORS

TECHNICAL FIELD

Embodiments of the present invention relate to the telecommunication field. More particularly, embodiments of the present invention relate to the calibration of transmitter apparatuses.

BACKGROUND

Modern wireless telecommunication systems need to guarantee transmissions with data transfer rates as high as possible; at the same time, they need to be designed in such a way to be cost-effective and to require low power consumptions.

For these reasons, systems based on the homodyne architecture are nowadays extensively exploited. Homodyne systems are based on a so-called direct conversion method, according to which a receiver directly converts the received signals from a carrier Radio Frequency (RF) to a base-band frequency. In this way, only one mixer stage is usually required in the receiver, thereby resulting in lower power consumption and easier implementation of the receiver in an integrated form. Thereby, homodyne systems allow avoiding the use of expensive intermediate-frequency filters, which are instead required in the heterodyne architectures.

Among the various known homodyne systems, an important class thereof includes the ones based on quadrature transmitters. As it is well known to those skilled in the art, a quadrature transmitter usually includes one or more quadrature modulators, which receive two base-band signals to be transmitted and generate a corresponding modulated signal. More particularly, the base-band signals are brought to the RF domain used for the transmission by properly modulating them with a corresponding carrier wave, so that the resulting signals are in quadrature to each other; then, the signals in quadrature are mixed together to form the modulated signal.

For example, the base-band signals of a typical quadrature homodyne architecture may be generated exploiting the so-called Orthogonal Frequency-Division Multiplexing (OFDM) technique, which is a particular digital modulation scheme that makes use of a large number of closely-spaced sinusoidal waves; likewise, the base band signals may by generated by filtering Binary Phase-Shift Keying (BPSK) sequences using Nyquist shapes or by exploiting other known techniques.

However, the occurrence of imperfections in real quadrature modulators, such as gain and phase imbalances, generates corresponding gain and phase errors in the modulated signal; the gain and phase errors may have a detrimental effect on the system performance. Compensation for these errors, either with digital signal processors or analog circuits, is essential in order to meet the stringent out-of-band emission requirements of modern wireless telecommunication systems.

In order to mitigate this problem, a possible solution is of pre-compensating the base-band signals to be modulated so as to counterbalance the gain and phase errors; for this purpose a proper compensation is applied to the base-band signals, which compensation is quantified according to an estimate of the gain and phase errors.

For example, the document "New Methods for Adaption of Quadrature Modulators and Demodulators in Amplifier Linearization Circuits" by J. K. Cavers discloses a method for compensating the gain and phase errors of quadrature modulators, which method make uses of a closed feedback measure loop. In particular, the method provides for feeding the quadrature modulator with a base-band test signal, which is modulated to obtain a corresponding RF signal; then, the RF signal is provided to an envelope detector, in such a way to obtain an indication of the gain and phase errors generated by the imperfections of the modulator. However, the output of the modulator is phase-dependant, since it depends on the test signal; thus the method requires the exact knowledge of a measure of the loop's delay, which is usually not available. An alternative solution provided by the method consists of the transmission of a dc tone in the base-band and then in the performing of measures with a "step and measure" technique. This last operation cannot be easily performed in OFDM systems, since the dc tone—corresponding to the frequency of the carrier—is usually removed by the circuits adapted to couple the base-band section with the RF section.

A different approach is disclosed in the document "A WLAN Direct Upconversion Mixer with Automatic Calibration" by Jan Craninckx, Bjorn Debaillie, Boris Come and Stephane Donnay. According to this approach, the modulated signal generated by the modulator is fed back to the inputs of the modulator, and the output thereof is used for estimating the compensation. The main drawback of this approach regards its hardware implementation, since a measure loop used for this approach has to include switches that need to be perfectly insulated.

SUMMARY

In view of the above, the Applicant has tackled the problem of improving the efficiency of the calibration solutions that are aimed at counterbalancing the modulation errors.

More specifically, an embodiment of the present invention provides a calibration method for reducing modulation errors in a telecommunication transmitter apparatus. The calibration method includes the steps of providing a pair of test signals, which are substantially in quadrature to each other, and to repeat an estimation loop. The estimation loop starts with the step of generating a modulated signal by modulating the test signals (the modulation introducing a modulation error). The method continues by obtaining a squared signal corresponding to the square of the modulated signal. A transformed signal corresponding to the squared signal in the frequency domain is then calculated. The estimation loop further includes the steps of calculating an error indicator, indicative of the modulation error, according to the modulus of the transformed signal. The method continues by calculating a compensation, to be applied to the test signals for counterbalancing the modulation error, according to the error indicator. The compensation is then applied to the test signals. The estimation loop is repeated until the error indicator reaches a threshold. The calibration method further includes the step of storing an indication of the compensation resulting from a last iteration of the estimation loop (for the application of the compensation to each pair of operative signals managed by the telecommunication transmitter apparatus during operation thereof).

In an embodiment of the invention, the step of generating the modulated signal includes modulating the two test signals with a carrier wave and combining them.

The step of calculating the transformed signal may include calculating a Fourier transform of the squared signal.

According to an embodiment of the invention, the error indicator is set equal to the modulus of the Fourier transform of the squared signal at a frequency equal to twice the frequency of the test signals.

In an embodiment of the invention, the modulation error includes a phase error and a gain error.

An embodiment of the present invention provides for calculating a phase compensation and a gain compensation.

An algorithm for estimating the phase compensation and the gain compensation from the error indicator is proposed. Specific implementations of this algorithm are also disclosed.

Another embodiment of the present invention provides a computer program to be executed on a calibration system for causing the system to perform the calibration method.

A further embodiment of the invention provides a calibration system.

According to an embodiment of the present invention, the calibration system includes a Gilbert cell circuit.

A still further embodiment of the present invention provides a transmitter apparatus including the calibration system.

According to an embodiment of the present invention, the transmitter apparatus comprises an orthogonal frequency division multiplexing modulator.

BRIEF DESCRIPTION OF THE DRAWINGS

The invention itself, as well as further features and the advantages thereof, will be best understood with reference to the following detailed description of embodiments thereof, given purely by way of a non-restrictive indication, to be read in conjunction with the accompanying drawings. Particularly.

DETAILED DESCRIPTION

The following discussion is presented to enable a person skilled in the art to make and use the invention. Various modifications to the embodiments will be readily apparent to those skilled in the art, and the generic principles herein may be applied to other embodiments and applications without departing from the spirit and scope of the present invention. Thus, the present invention is not intended to be limited to the embodiments shown, but is to be accorded the widest scope consistent with the principles and features disclosed herein.

Figure 1:
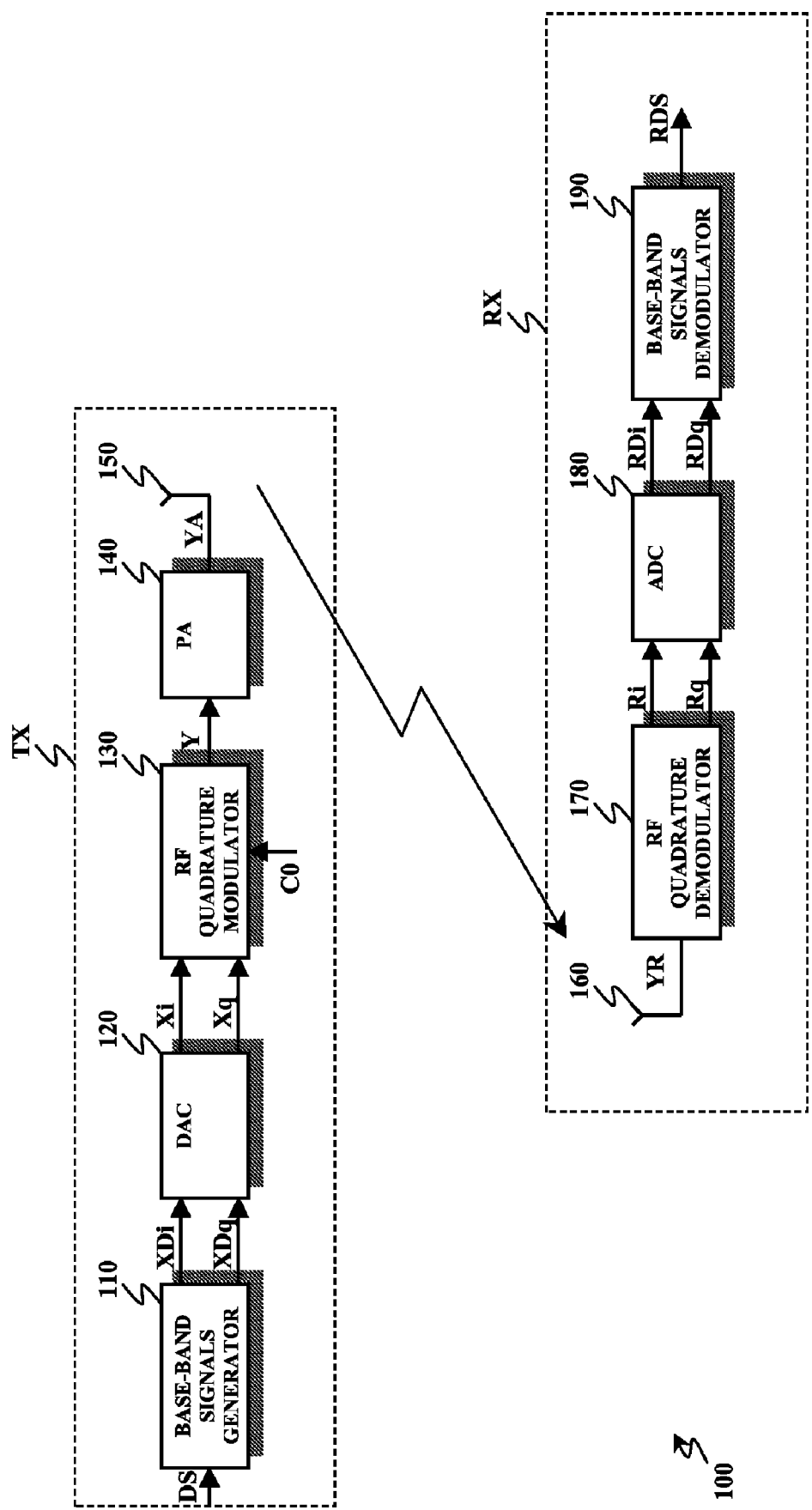
FIG. 1 schematically illustrates, in terms of functional blocks, the main components of a wireless homodyne telecommunication system in which calibration methods according to embodiments of the present invention can be used.

With reference to the drawings, FIG. 1 schematically shows, in terms of functional blocks, the main components of a wireless homodyne telecommunication system 100 in which calibration methods according to embodiments of the present invention can be used.

The telecommunication system 100 includes a transmitter (apparatus) TX and a receiver (apparatus) RX. In order to simplify the present description, the telecommunication system 100 includes only a single transmitter TX and a single receiver RX. However, the concepts that will be presented in the following of the description are applicable to more complex (and actual) systems, in which more than one transmitter interact with more than one receiver.

The transmitter TX includes a base-band signals generator 110 (for example, a OFDM modulator) adapted to digitally modulate a data stream DS of bits to be transmitted. More particularly, the base-band signals generator 110 receives the data stream DS and provides two corresponding (base-band) digitally modulated signals XDi and XDq. Without entering into details not relevant for the purposes of the present description, in case the base-band signals generator 110 is an OFDM modulator, each digitally modulated signal XDi, XDq is generated by properly combining the bits of the data stream DS with a plurality of sinusoidal waves; for example, according to a particular modulation scheme, the (complex) amplitudes of the sinusoidal waves take values depending on the values of the bits of the data stream DS.

The digitally modulated signals XDi and XDq are then provided to a Digital to Analog Converter (DAC) circuit 120, where they are converted into corresponding (analog) base-band signals Xi and Xq, respectively.

The base-band signals Xi, Xq are then provided to an RF quadrature modulator 130—which also receives a carrier wave C0 oscillating at a radio frequency (RF)—where they are modulated and converted to the RF domain. More particularly, as will be described in greater detail in the following of the present description, the base-band signals Xi, Xq are firstly converted to the RF domain and then are added together so as to form an RF modulated signal Y.

The RF modulated signal Y is provided to a power amplifier (PA) 140, which strengthens the RF modulated signal Y for obtaining a corresponding transmission signal YA; the power amplifier 140 then applies the transmission signal YA to a transmitting antenna 150.

The receiver RX includes a receiving antenna 160, adapted to pick up the transmission signal YA; the antenna 160 provides a corresponding reception signal YR to an RF quadrature demodulator 170, which demodulates the reception signal YR into two base-band signals Ri, Rq (corresponding to the base-band signals Xi, Xq).

The base-band signals Ri, Rq are then provided to an Analog to Digital Converter (ADC) 180. The ADC 180 generates two corresponding digitally modulated signals RDi, RQi, which are in turn provided to a base-band signals demodulator 190.

The base-band signals demodulator 190 digitally demodulates the signals RDi, RQi so as to retrieve a data stream RDS of bits corresponding to the data stream DS.

Figure 2A:
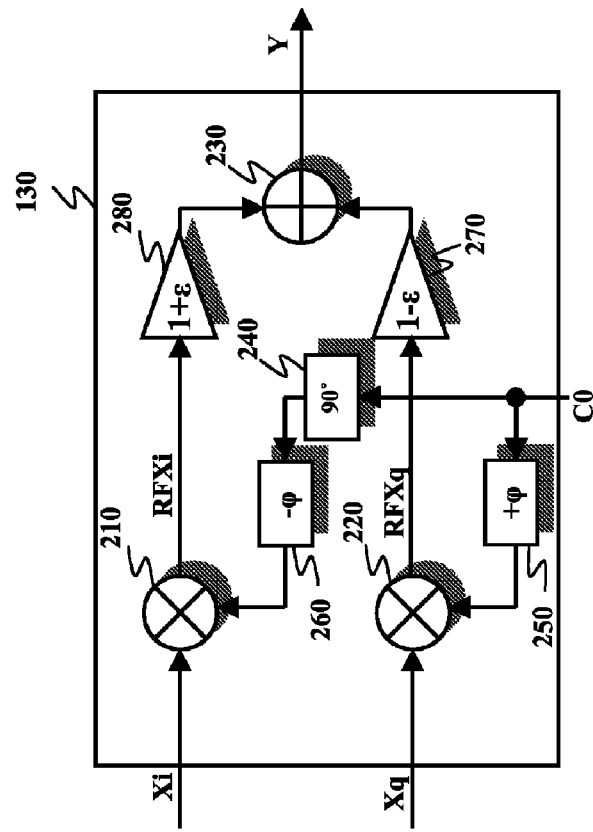
FIG. 2A schematically shows, in terms of simplified functional blocks, an example of how an RF quadrature modulator included in the telecommunication system of FIG. 1 can be structured.

FIG. 2A schematically shows, in terms of simplified functional blocks, an example of how the RF quadrature modulator 130 can be structured.

Particularly, the RF quadrature modulator 130 includes a pair of multipliers 210, 220, an adder 230 and a phase-shifter 240.

The multiplier 220 receives the base-band signal Xq and the carrier wave C0; the multiplier 220 modulates the carrier wave C0 according to the base-band signal Xq, so as to generate a corresponding RF modulated signal RFXq; in a similar way, the base-band signal Xi is provided to the multiplier 210 together with a phase-shifted version of the carrier wave C0 generated by the phase-shifter 240, in order to obtain a corresponding RF modulated signal RFXi. More particularly, the phase-shifter 240 is designed to introduce a phase-shift of 90 degrees on the carrier wave C0, so that the RF modulated signals RFXq, RFXi are in quadrature to each other. The RF modulated signals RFXq, RFXi are then provided to the adder 230 for being summed to each other so as to obtain the RF modulated signal Y.

However, real quadrature modulators are subjected to imperfections (such as gain and phase imbalances) that generate corresponding errors in the RF modulated signal Y. A simple model illustrating how the imbalances can affect the RF quadrature modulator 130 of FIG. 2A is schematically illustrated in FIG. 2B.

Figure 2B:
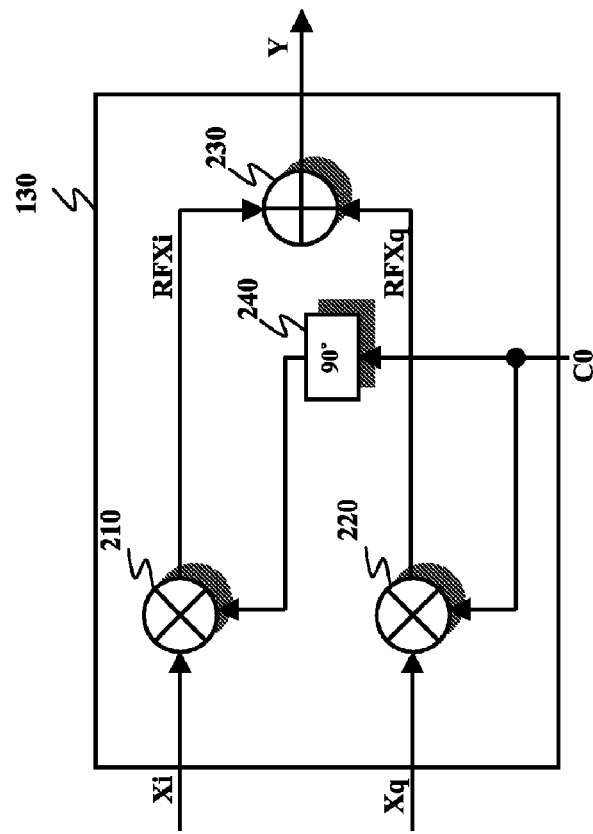
FIG. 2B schematically shows a simple model illustrating how gain and phase imbalances can affect the RF quadrature modulator of FIG. 2A.

In FIG. 2B the phase imbalance is represented by two phase imbalance blocks 250, 260. The phase imbalance block 250 acts on the input of the multiplier 220 receiving the carrier wave C0 by introducing a phase shift $\phi$, hereinafter referred to as phase error, while the phase imbalance block 260 acts on the input of the multiplier 210 receiving the shifted carrier wave C0 by introducing a phase error $-\phi$. With this simple model, the RF modulated signals RFXq, RFXi experience an—undesired—phase difference equal to $2\phi$.

In a similar way, the gain imbalance is represented in FIG. 2B by means of two gain imbalance blocks 270 and 280 that act on the RF modulated signals RFXq and RFXi, respectively. More particularly, the effect of the gain imbalance block 270 is a reduction of the amplitude of the RF modulated signal RFXq, which is amplified by an amount equal to $(1-\epsilon)$—where the term $\epsilon$, hereinafter referred to as gain error, is a number whose absolute value is lower than the unity; the effect of the gain imbalance block 280 is instead an increase of the amplitude of the RF modulated signal RFXi, which is amplified by an amount equal to $(1+\epsilon)$. With this simple model, the RF modulated signals RFXi, RFXq experience an—undesired—gain difference equal to $2\epsilon$.

In order to express the effect of the phase and gain imbalances, we define a fictitious signal X (referred to as equivalent base-band signal) in the following way:

$$X = Xi + jXq,$$

wherein j is the imaginary unity.

Likewise, we express the RF modulated signal Y with its equivalent in the base-band, referred to as base-band modulated signal $Y_{bb}$:

$$Y_{bb} = Yi + jYq$$

(wherein Yi, Yq are the real and imaginary parts thereof).

Therefore, we can express the base-band modulated signal $Y_{bb}$ as a function of the equivalent base-band signal X in the base-band domain:

$$Y_{bb} = (\cos(\phi) + j\epsilon \sin(\phi))X + (\epsilon \cos(\phi) + j \sin(\phi))X^* = \Gamma_1 X + \Gamma_2 X^*,$$

wherein '*' is the complex conjugate operator, $\Gamma_1 = (\cos(\phi) + j\epsilon \sin((\phi))$ and $\Gamma_2 = (\epsilon \cos((\phi) + j \sin((\phi))$.

For low values of the phase error $\phi$ and gain error $\epsilon$, the terms $\Gamma_1$ and $\Gamma_2$ can be simplified in the following way:

$$\Gamma_1 \cong 1 + j\epsilon\phi$$

$$\Gamma_2 \cong \epsilon + j\phi$$

It can be appreciated that the presence of the phase and gain imbalances generates a signal component proportional to the complex conjugate of the equivalent base-band signal X. This signal component is capable of altering the base-band modulated signal $Y_{bb}$, and then the RF modulated signal Y, to an extent such as to dull the performance of the whole telecommunication system.

This can be easily appreciated in case the equivalent base-band signal X is a complex exponential signal oscillating at a frequency $f_t$:

$$X = e^{j(2\pi f_t + 9)},$$

wherein $\theta$ is the starting phase of the equivalent base-band signal X. Indeed, with such an equivalent base-band signal X, the presence of the phase and gain imbalances in the modulation process generates a base-band modulated signal $Y_{bb}$ that includes an unwanted signal component that oscillates at the frequency $-f_t$ (also referred to as "imagine" frequency of the frequency $f_t$), as can be observed in the following equation:

$$Y_{bb} = \Gamma_1 X + \Gamma_2 X^* = \Gamma_1 e^{j(2\pi f_t + 9)} + \Gamma_2 e^{-j(2\pi f_t + 9)} \cong (1 + j\epsilon\phi) e^{j(2\pi f_t + 9)} + (\epsilon + j\phi) e^{-j(2\pi f_t + 9)}.$$

From the above expression it can be appreciated that the higher the values of the phase error $\phi$ and gain error $\epsilon$, the higher the magnitude of the component oscillating at the imagine frequency $-f_t$ that affects the base-band modulated signal $Y_{bb}$, and the higher the degradation of the transmission performance.

Figure 2C:
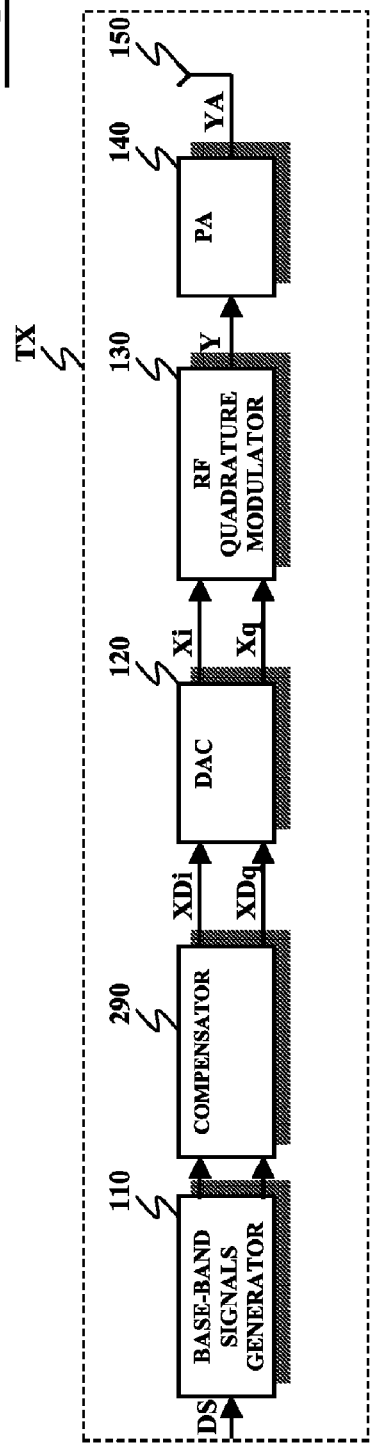
FIG. 2C illustrates a transmitter apparatus included in the telecommunication system of FIG. 1 when it is connected to a compensator.

As illustrated in FIG. 2C, in order to reduce the negative effects of the phase error $\phi$ and gain error $\epsilon$ on the modulation process, a compensator 290 is provided between the base-band signals generator 110 and the DAC circuit 120. The compensator 290 modifies the signals received from the base-band signals generator 110 based on phase and gain compensation parameters $\phi c$, $\epsilon c$ (with the modified signals that are denoted with the same reference). The compensation parameters $\phi c$, $\epsilon c$ are determined during a calibration phase that is performed before the transmitter TX is exploited for its normal operation.

Figure 3:
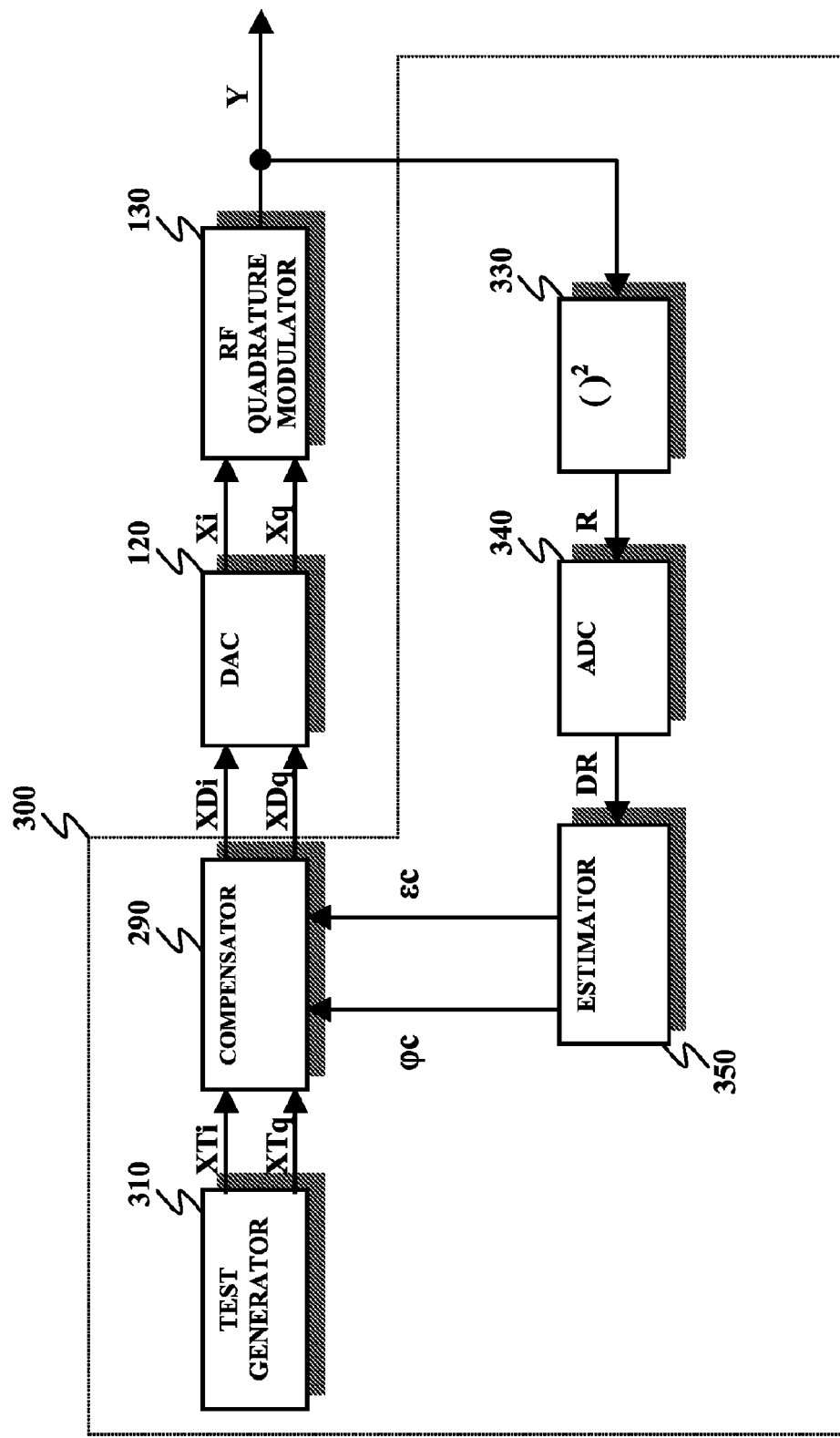
FIG. 3 illustrates a calibration system capable of reducing the negative effects of phase and gain errors on the modulation process caused by the gain and phase imbalances, according to an embodiment of the present invention.

FIG. 3 illustrates a calibration system 300 capable of estimating (during the calibration phase) the compensation parameters $\phi c$, $\epsilon c$.

During the calibration phase, the calibration system 300 generates proper digitally modulated signals XDi, XDq that are provided to the DAC circuit 120. As previously described, the DAC circuit 120 converts the signals into the corresponding base-band signals Xi, Xq that are provided to the RF quadrature modulator 130. The resulting RF modulated signal Y (which, in general, is affected by the phase error $\phi$ and gain error $\epsilon$) is then feedback to the calibration system 300. The calibration system 300 analyzes the RF modulated signal Y for establishing how the transmitter TX has to be calibrated for reducing the effects of the phase error $\phi$ and gain error $\epsilon$, and accordingly generates the compensation parameters $\phi c$, $\epsilon c$.

More particularly, the calibration system 300 includes a test generator 310 for the generation of a pair of test signals XTi, XTq. For example, the test generator 310 is included in the base-band signals generator, and it is deactivated during the normal operation of the transmitter TX; alternatively, the test generator 310 is a dedicated apparatus that is available only during the calibration phase.

The test signals XTi, XTq are provided to the compensator 290, which is also configured to receive the phase compensation parameter $\phi c$ and the gain compensation parameter $\epsilon c$. The compensator 290 modifies the received test signals XTi, XTq based on the phase and gain compensation parameters $\phi c$, $\epsilon c$, and accordingly generates the digitally modulated signals XDi, XDq to be provided to the DAC circuit 120.

More particularly, the digitally modulated signals XDi, XDq are given by the following equations:

$$XDi = XTi(1+\epsilon c) + XTq \cdot \phi c$$

$$XDq = XTq(1-\epsilon c) + XTi \cdot \phi c.$$

An example of how the compensator 290 implementing the two previous equations can be structured is shown in "New Methods for Adaption of Quadrature Modulators and Demodulators in Amplifier Linearization Circuits", J. K. Cavers, Transaction on vehicular Technology, vol. 46, No. 3, August 1997 (the entire disclosure of which is herein incorporated by reference).

In a solution according to an embodiment of the present invention, as described in detail in the following, the compensation parameters obtainable by means of the calibration system 300 are calculated starting from two test signals that are in quadrature to each other. The corresponding modulated signal is squared, filtered and then converted into the frequency domain. The modulus of the transformed signal so obtained allows estimating the error to be corrected, and a corresponding compensation to be applied to the test signals.

In greater detail, the test signals XTi, XTq have the same amplitude and oscillate at a same frequency $f_t$ with a phase-shift of 90 degrees; we can define a fictitious signal (referred to as base-band common test signal XT):

$$XT = XTi + jXTq = e^{j(2\pi f_t t + \theta)} = Ve^{j(2\pi f_t t)},$$

wherein $V = \cos(\theta) + j\sin(\theta)$.

According to an embodiment of the present invention, the calibration system 300 further includes a non-linear quadratic block 330, for example a Gilbert cell circuit, coupled to the output of the RF quadrature modulator 130 for receiving the RF modulated signal Y. The non-linear quadratic block 330 calculates a squared modulated signal R, whose equivalent in the base band, referred to as base-band squared modulated signal $R_{bb}$ equal to:

$$R_{bb} = Y_{bb} \cdot Y^*_{bb}.$$

The squared modulated signal R is then provided to an ADC 340, which digitalizes the squared modulated signal R for providing a digitalized version thereof, referred to as digital squared signal DR, to an estimator 350.

The estimator 350 generates the phase compensation parameter $\phi c$ and the gain compensation parameter $\epsilon c$ according to the digital squared signal DR (i.e., to the squared modulated signal R).

For this purpose, the estimator 350 calculates the Fourier transform of the base-band squared modulated signal $R_{bb}$, denoted as $F_{bb}(R,f)$ (f is a generic frequency):

$$F_{bb}(R_{bb},f) = F_{bb}(Y_{bb},f) * F_{bb}(Y_{bb},-f),$$

wherein "*" is the convolution operator; particularly, the Fourier transform of the base-band modulated signal $Y_{bb}$, $F_{bb}(Y_{bb},f)$, is equal to:

$$F_{bb}(Y_{bb},f) = (\Gamma_1 V) \cdot \delta(f-f_t) + (\Gamma_2 V^*) \cdot \delta(f+f_t),$$

wherein $\delta(f)$ is the Dirac delta function.

It has to be appreciated that from the Fourier transform $F_{bb}(R_{bb},f)$ of the base-band squared modulated signal $R_{bb}$ it is possible to retrieve information regarding the phase error $\phi$ and gain error $\epsilon$ that affect the transmitter TX. More particularly, this can be shown by calculating the Fourier transform $F_{bb}(R_{bb},f)$ at a frequency $2f_t$ (i.e., at a frequency that is twice the frequency $f_t$ of the test signals XTi, XTq):

$$F_{bb}(R_{bb},f=2f_t) = \Gamma_1 V \Gamma^*_2 V \cong \epsilon \cos(2\theta) + \phi \sin(2\theta) + j(\epsilon \sin(2\theta) - \phi \cos(2\theta)),$$

wherein the expression has been approximated, by considering low values of the phase error $\phi$ and gain error $\epsilon$.

The modulus (referred to as error indicator M) of the previous expression is then:

$$M = |F_{bb}(R_{bb},f=2f_t)| \cong [\epsilon^2 \cdot \cos^2(2\theta) + \phi^2 \cdot \sin^2(2\theta) + 2\epsilon \cdot \cos(2\theta) \cdot \phi \cdot \sin(2\theta) + \epsilon^2 \cdot \sin^2(2\theta) + \phi^2 \cdot \cos^2(2\theta) - 2\epsilon \cdot \sin(2\theta)]^{1/2} = (\epsilon^2 + \phi^2)^{1/2}.$$

As can be seen, the expression does not depend on the phase $\theta$ of the base-band common test signal XT; therefore, it is possible to estimate the phase error $\phi$ and gain error $\epsilon$ introduced by the modulation process without having to exactly know the propagation delay that the test signals XTi, XTq experience traveling through the calibration system 300, since the error indicator M does not depend on the phase $\theta$.

It has to be appreciated that the error indicator M does not allow to quantify the value of the phase error $\phi$ and of the gain error $\epsilon$ in an univocally way; indeed, infinite pairs of phase errors $\phi$ and gain errors $\epsilon$ exist for a given error indicator M. However, the error indicator M provides very useful information regarding a global extent of the error given by the phase imbalance and the gain imbalance taken together: the higher the value of the error indicator M, the higher the error affecting the operation of the transmitter TX.

Figure 4:
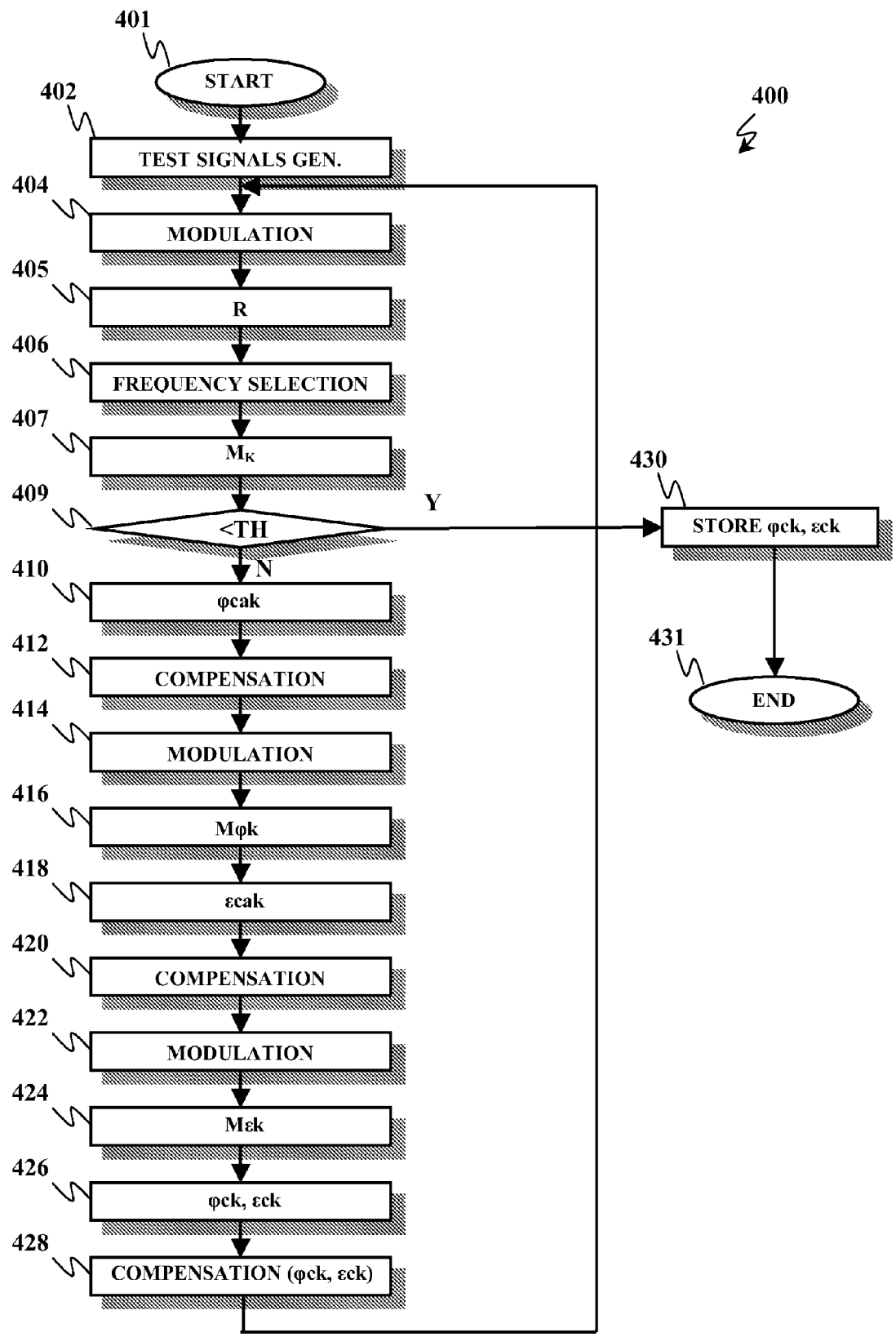
FIG. 4 shows a flow chart illustrating the operations performed during a calibration phase performed by the calibration system of FIG. 3 according to an embodiment of the present invention.

In order to describe how the calibration system operates according to an embodiment of the present invention (to estimate the phase error $\phi$ and gain error $\epsilon$ from the error indicator M), reference will be now made to FIG. 4, which shows a flow chart 400 illustrating the operations performed during the calibration phase.

As will be described in the following, the calibration phase illustrated by the flow chart 400 provides for the cyclic repetition of a loop. Thus, for the sake of clarity, some of the quantities (e.g., signals and parameters) generated and/or exploited during a generic k-th iteration of the loop of the calibration phase will be specifically identified with an index "k".

The flow of activity of the calibration phase initiates at block 401, and then passes to block 402, wherein the test signals XTi, XTq (in quadrature to each other) are generated. The digitally modulated signals XDi, XDq are then set equal to the test signals XTi, XTq (without any compensation).

The method now enters a loop at the block 404, wherein the digitally modulated signals XDi, XDq are converted into the base-band signals Xi, Xq; the base-band signals Xi, Xq are then provided to the RF quadrature modulator, which accordingly generates the RF modulated signal Y (affected by the phase error $\phi_k$ and by the gain error $\epsilon_k$).

Continuing to block 405, the RF modulated signal Y is provided to the non-linear quadratic block, which calculates the squared modulated signal R. The squared modulated signal R is converted into the corresponding digital squared signal DR, which is provided to the estimator.

At block 406, the estimator selects a particular frequency—the frequency $2f_t$—from the spectrum of $R_{bb}$; for this purpose, the estimator calculates the Fourier transform of $R_{bb}$ at the frequency $2f_t$. Then, at block 407, the error indicator $M_k$ is set to the modulus of the Fourier transform at the frequency $2f_t$ (i.e., $M_k = (\epsilon_k^2 + \phi_k^2)^{(1/2)}$).

The estimator at block 409 compares the error indicator $M_k$ with a threshold value TH, which determines the desired accuracy of the calibration process.

If the error indicator $M_k$ is higher than the threshold value TH (exit branch "N"), the flow of activity continues to block 410, for determining the phase error $\phi_k$ and the gain error $\epsilon_k$ corresponding to the error indicator $M_k$. For this purpose, the estimator sets an auxiliary phase compensation parameter $\phi c_{ak}$ to the compensation parameter $\phi c_{k-1}$ at a previous iteration (k−1) of the loop (with $\phi c_0$=0) plus a phase variation $\Delta\phi c_k$ equal to half the error indicator $M_k$, (i.e., $\Delta\phi c_k$=$M_k$/2):

$$\phi c_{ak} = \phi c_{k-1} + \Delta\phi c_k.$$

Continuing to block 412, the auxiliary phase compensation parameter $\phi c_{ak}$ is provided to the compensator, wherein the test signals XTi, XTq are compensated according to the auxiliary phase compensation parameter $\phi c_{ak}$ and the gain compensation parameter $\epsilon c_{k-1}$ at the previous iteration k−1-th of the loop (with $\epsilon c_0$=0), so as to obtain a pair of corresponding phase compensated digitally modulated signals $XDi\phi_k$, $XDq\phi_k$.

At this point, the flow of the activity continues to the block 414, wherein the phase compensated digitally modulated signals $XDi\phi_k$, $XDq\phi_k$ are converted into a pair of phase compensated base-band signals $Xi\phi_k$, $Xq\phi_k$. The phase compensated base-band signals $Xi\phi_k$, $Xq\phi_k$ are then provided to the RF quadrature modulator, which accordingly generates a phase compensated RF modulated signal $Y_{\phi k}$, affected by a (phase compensated) phase error $\phi_{\phi k}$ and by a (phase compensated) gain error $\epsilon_{\phi k}$.

Continuing to block 416, the phase compensated RF modulated signal $Y_{\phi k}$ is provided to the non-linear quadratic block, which calculates a (phase compensated) squared modulated signal $R_{\phi k}$; the squared modulated signal $R_{\phi k}$ is converted into a corresponding (phase compensated) digital squared signal $DR_{\phi k}$, which is provided to the estimator. In the same way as previously described, the estimator retrieves (from the digital squared signal $DR_{\phi k}$) a corresponding phase error indicator $M_{\phi k}$, whose value is equal to $(\epsilon_{\phi k}^2 + \phi_{\phi k}^2)^{(1/2)}$.

The flow of activity passes now to block 418, wherein the estimator sets an auxiliary gain compensation parameter $\epsilon c_{ak}$ to the compensation parameter $\epsilon c_{k-1}$ at a previous iteration (k−1) of the loop plus a gain variation $\Delta\epsilon c_k$ equal to half the error indicator $M_k$ (i.e., $\Delta\epsilon c_k$=$M_k$/2):

$$\epsilon c_{ak} = \epsilon c_{k-1} + \Delta\epsilon c_k.$$

Continuing to block 420, the auxiliary gain compensation parameter $\epsilon c_{ak}$ is provided to the compensator, wherein the test signals XTi, XTq are compensated according to the auxiliary gain compensation parameter $\epsilon c_{ak}$ and the phase compensation parameter $\phi_{k-1}$ at the previous iteration k−1 of the loop so as to obtain a pair of corresponding gain compensated digitally modulated signals $XDi\epsilon_k$, $XDq\epsilon_k$.

At this point, the flow of the activity continues to the block 422, wherein the gain compensated digitally modulated signals $XDi\epsilon_k$, $XDq\epsilon_k$ are converted into gain compensated base-band signals $Xi\epsilon_k$, $Xq\epsilon_k$. The gain compensated base-band signals $Xi\epsilon_k$, $Xq\epsilon_k$ are then provided to the RF quadrature modulator, which accordingly generates a gain compensated RF modulated signal $Y_{\epsilon k}$, affected by a (gain compensated) phase error $\phi_{\epsilon k}$ and by a (gain compensated) gain error $\epsilon_{\epsilon k}$.

Continuing to block 424, the RF gain compensated modulated signal $Y_{\epsilon k}$ is provided to the non-linear quadratic block, which calculates a (gain compensated) squared modulated signal $R_{\epsilon k}$; the squared modulated signal $R_{\epsilon k}$ is converted into a corresponding (gain compensated) digital squared signal $DR_{\epsilon k}$, which is provided to the estimator. In the same way as previously described, the estimator retrieves (from the digital squared signal $DR_{\epsilon k}$) a corresponding gain error indicator $M_{\epsilon k}$, whose value is equal to $(\epsilon_{\epsilon k}^2 + \phi_{\epsilon k}^2)^{(1/2)}$.

Then, the flow of activity proceeds to block 426, wherein the estimator calculates the compensation parameters $\phi c_k$ and $\epsilon c_k$ by exploiting the phase error indicator $M_{\phi k}$ and the gain error indicator $M_{\epsilon k}$. More particularly, the phase compensation parameter $\phi c_k$ is calculated using the following formula:

$$\varphi c_k = w \frac{M_{\varphi k} - M_k}{\Delta \varphi c_k} M_k + \varphi c_{k-1},$$

wherein w is a positive weight that is lower than one (for example, equal to 0.5-0.9). The term $$\frac{M_{\varphi k} - M_k}{\Delta \varphi c_k}$$

is an approximation of the derivative of the error indicator with respect to the phase compensation variation. In a similar way, the gain compensation parameter $\epsilon c_k$ is calculated by using the following formula:

$$\varepsilon c_k = w \frac{M_{\varepsilon k} - M_k}{\Delta \varepsilon c_k} M_k + \varepsilon c_{k-1}.$$

The term $$\frac{M_{\varepsilon k} - M_k}{\Delta \varepsilon c_k}$$

is likewise an approximation of the derivative of the error indicator with respect to the gain compensation variation. In other words, according to an embodiment of the present invention, the compensation parameters $\phi c_k$ and $\epsilon c_k$ are calculated taking into account how the phase error indicator $M_{\phi k}$ and the gain error indicator $M_{\epsilon k}$ change in response to variations of the phase and gain compensation parameters, respectively, that are individually set at every iteration of the loop of the calibration phase.

The k-th iteration of the loop ends with block 428, wherein the compensation parameters $\phi c_k$ and $\epsilon c_k$ are provided to the compensator, for compensating the signals XTi, XTq accordingly.

At this point, the flow of activity returns to the block 404 for repeating the same operations at a next iteration of the loop.

Coming back to the block 409, in case the error indicator $M_k$ is equal to or lower than the threshold value TH (exit branch "Y"), the method exits the above described loop. More particularly, the flow of activity continues to the block 430, wherein the compensation parameters $\phi c_k$, $\epsilon c_k$ that have been calculated in the last iteration of the loop are stored in the compensator; these values may then be used in the transmitter during its normal operation for counterbalancing the negative effects of the errors on the modulation process. The method then ends at the final block 431.

Naturally, in order to satisfy local and specific requirements, a person skilled in the art may apply to the solution described above many logical and/or physical modifications and alterations. More specifically, although the present invention has been described with a certain degree of particularity with reference to preferred embodiment(s) thereof, it should be understood that various omissions, substitutions and changes in the form and details as well as other embodiments are possible. Particularly, the proposed solution may even be practiced without the specific details (such as the numerical examples) set forth in the preceding description to provide a more thorough understanding thereof; conversely, well-known features may have been omitted or simplified in order not to obscure the description with unnecessary particulars. Moreover, it is expressly intended that specific elements and/or method steps described in connection with any disclosed embodiment of the invention may be incorporated in any other embodiment as a matter of general design choice.

For example, the proposed solution may be implemented with an equivalent method (using similar steps, removing non essential steps or adding optional steps).

The concepts of the present invention are also applicable to test signals having phase differences that are slightly different than 90 degrees; similar considerations apply in case their amplitudes are not equal, but instead differ by a small amount.

Likewise, the error indicator may be obtained from the transformed signal in an equivalent way.

In any case, the concepts of the present invention are also applicable in case the modulated signal is generated in an equivalent manner.

Even though reference has been made to the Fourier transform, similar considerations apply in case the frequency selection of the squared modulated signal is performed in another way.

The concepts of the present invention are also applicable in case the modulus of the transformed signal is calculated at a frequency that is slightly different from twice the test frequency.

Even though less efficient, it is not excluded to calculate only the phase compensation and not the gain compensation, or vice versa; in this way only one among the phase error and the gain error is compensated.

Similar considerations apply in case the modulation errors include different errors other than the phase and gain errors.

Naturally, the step of calculating the gain compensation may be performed before the step of calculating the phase compensation.

Moreover, the phase and gain compensations may be determined according to different relationships with the phase and gain error indicators.

It is not excluded to set the auxiliary phase compensation and the auxiliary phase compensation to a value different than half the error indicator.

Even though reference has been made to a calibration system for a transmitter apparatus that includes an OFDM modulator, the proposed solution may be applied to different transmitter apparatuses, in which the modulation is carried out in a different way.

Transmitters including embodiments of the present invention may be contained in a variety of different types of electronic systems and devices, such as cellular telephones, personal digital assistants, computer systems, and so on.

From the foregoing it will be appreciated that, although specific embodiments of the invention have been described herein for purposes of illustration, various modifications may be made without deviating from the spirit and scope of the invention.

What is claimed is:

1. A calibration method for reducing modulation errors in a telecommunication transmitter apparatus, the calibration method including the steps of:
    providing a pair of test signals, the test signals being substantially in quadrature to each other;
    iterating an estimation loop including:
        generating a modulated signal by modulating the test signals, the modulation introducing a modulation error;
        obtaining a squared signal corresponding to the square of the modulated signal;
        calculating a transformed signal corresponding to the squared signal in the frequency domain;
        calculating an error indicator according to the modulus of the transformed signal, the error indicator being indicative of the modulation error;
        calculating a compensation, to be applied to the test signals for counterbalancing the modulation error, according to the error indicator, and
        applying said compensation to the test signals,
    until the error indicator reaches a threshold, and
    storing an indication of the compensation resulting from a last iteration of the estimation loop for the application of the compensation to each pair of operative signals managed by the telecommunication transmitter apparatus during operation thereof.

2. The calibration method of claim 1, wherein the step of generating the modulated signal includes:
    modulating the two test signals with a carrier wave, and
    obtaining the modulated signal by combining said modulated test signals.

3. The calibration method of claim 1, wherein the step of calculating the transformed signal includes calculating a Fourier transform of the squared signal.

4. The calibration method of claim 3, wherein the test signals oscillate at a test frequency, the step of calculating the error indicator including:
    calculating the modulus of the Fourier transform of the squared signal at a frequency equal to twice the test frequency, and
    setting the error indicator to said modulus.

5. A calibration method for reducing modulation errors in a telecommunication transmitter apparatus, the calibration method including the steps of:
    providing a pair of test signals, the test signals being substantially in quadrature to each other;
    iterating an estimation loop including:
        generating a modulated signal by modulating the test signals, the modulation introducing a modulation error;
        obtaining a squared signal corresponding to the square of the modulated signal;
        calculating a transformed signal corresponding to the squared signal in the frequency domain;
        calculating an error indicator according to the modulus of the transformed signal, the error indicator being indicative of the modulation error;
        calculating a compensation, to be applied to the test signals for counterbalancing the modulation error, according to the error indicator, and
        applying said compensation to the test signals,
    until the error indicator reaches a threshold, and
    storing an indication of the compensation resulting from a last iteration of the estimation loop for the application of the compensation to each pair of operative signals managed by the telecommunication transmitter apparatus during operation thereof, wherein the modulation error includes a phase error and a gain error, the step of calculating the compensation including:
    calculating a phase compensation to be applied to the test signals for counterbalancing the phase error and a gain compensation to be applied to the test signals for counterbalancing the gain error.

6. The calibration method of claim 5, wherein the step of calculating the phase compensation and the gain compensation includes:
  calculating an auxiliary phase compensation according to the error indicator;
  obtaining a pair of phase compensated test signals by applying the auxiliary phase compensation to the test signals;
  generating a phase modulated signal by modulating the phase compensated test signals;
  obtaining a phase squared signal corresponding to the square of the phase modulated signal;
  calculating a phase transformed signal corresponding to the phase squared signal in the frequency domain;
  calculating a phase error indicator according to the modulus of the phase transformed signal;
  calculating an auxiliary gain compensation according to the error indicator;
  obtaining a pair of gain compensated test signals by applying the auxiliary gain compensation to the test signals;
  generating a gain modulated signal by modulating the gain compensated test signals;
  obtaining a gain squared signal corresponding to the square of the gain modulated signal;
  calculating a gain transformed signal corresponding to the gain squared signal in the frequency domain,
  calculating a gain error indicator according to the modulus of the gain transformed signal, and
  determining the phase compensation and the gain compensation according to the phase error indicator and the gain error indicator.

7. The calibration method of claim 6, wherein the step of determining the phase compensation and the gain compensation during each iteration of the estimation loop includes:
  determining the phase compensation by adding a phase derivative term based on the difference between the phase error indicator and the error indicator to the phase compensation being obtained at a preceding iteration of the estimation loop, the phase compensation being set to the phase derivative term during a first iteration of the estimation loop, and
  determining the gain compensation by adding a gain derivative term based on the difference between the gain error indicator and the error indicator to the gain compensation being obtained at a preceding iteration of the estimation loop, the gain compensation being set to the gain derivative term during the first iteration of the estimation loop.

8. The calibration method of claim 7, wherein:
  the step of calculating the auxiliary phase compensation during each iteration of the estimation loop includes adding a phase variation term substantially equal to half the error indicator to the auxiliary phase compensation being obtained at a preceding iteration of the estimation loop, the auxiliary phase compensation being set equal to half the error indicator during a first iteration of the estimation loop, and
  the step of calculating the auxiliary gain compensation during each iteration of the estimation loop includes adding a gain variation term substantially equal to half the error indicator to the auxiliary gain compensation being obtained at a preceding iteration of the estimation loop, the auxiliary gain compensation being set equal to half the error indicator during a first iteration of the estimation loop.

9. The calibration method of claim 8, wherein:
  the phase derivative term is proportional to the difference between the phase error indicator and the error indicator divided by the phase variation term and multiplied by the error indicator; and
  the gain derivative term is proportional to the difference between the gain error indicator and the error indicator divided by the gain variation term and multiplied by the error indicator.

10. A computer program product including a computer-usable medium embodying a computer program, the computer program when executed on a calibration system causing the system to perform a calibration method for reducing modulation errors in a telecommunication transmitter apparatus, wherein the method includes the steps of:
  providing a pair of test signals, the test signals being substantially in quadrature to each other;
  iterating an estimation loop including:
    generating a modulated signal by modulating the test signals, the modulation introducing a modulation error;
    obtaining a squared signal corresponding to the square of the modulated signal;
    calculating a transformed signal corresponding to the squared signal in the frequency domain;
    calculating an error indicator according to the modulus of the transformed signal, the error indicator being indicative of the modulation error;
    calculating a compensation, to be applied to the test signals for counterbalancing the modulation error, according to the error indicator, and
    applying said compensation to the test signals,
  until the error indicator reaches a threshold, and
  storing an indication of the compensation resulting from a last iteration of the estimation loop for the application of the compensation to each pair of operative signals managed by the telecommunication transmitter apparatus during operation thereof.

11. A calibration system for reducing modulation errors in a telecommunication transmitter apparatus, the calibration system including:
  means for providing a pair of test signals, the test signals being substantially in quadrature to each other;
  means for generating a modulated signal by modulating the test signals, the modulation introducing a modulation error;
  means for obtaining a squared signal corresponding to the square of the modulated signal;
  means for calculating a transformed signal corresponding to the squared signal in the frequency domain;
  means for calculating an error indicator corresponding to the modulus of the transformed signal, the error indicator being indicative of the modulation error;
  means for calculating a compensation, to be applied to the test signals for counterbalancing the modulation error, according to the error indicator,
  means for applying said compensation to the test signals, and
  means for storing an indication of the compensation for the application of the compensation to each pair of operative signals managed by the telecommunication transmitter apparatus during operation thereof.

12. A calibration system for reducing modulation errors in a telecommunication transmitter apparatus, the calibration system including:
  a test generator for generating a pair of test signals, the test signal being substantially in quadrature to each other;

a modulator for generating a modulated signal by modulating the test signals, the modulation introducing a modulation error;

a non-linear quadratic block for obtaining a squared signal corresponding to the square of the modulated signal;

an estimator for calculating:
- a transformed signal corresponding to the squared signal in the frequency domain,
- an error indicator corresponding to the modulus of the transformed signal, the error indicator being indicative of the modulation error, and
- a compensation, to be applied to the test signals for counterbalancing the modulation error, according to the error indication;

a compensator for applying said compensation to the test signals, and a memory for storing an indication of the compensation for the application of the compensation to each pair of operative signals managed by the telecommunication transmitter apparatus during operation thereof.

13. The calibration system of claim 12, wherein the non-linear quadratic block includes a Gilbert cell circuit.

14. A transmitter apparatus including a calibration system for reducing modulation errors, the calibration system including:
- means for providing a pair of test signals, the test signals being substantially in quadrature to each other;
- means for generating a modulated signal by modulating the test signals, the modulation introducing a modulation error;
- means for obtaining a squared signal corresponding to the square of the modulated signal;
- means for calculating a transformed signal corresponding to the squared signal in the frequency domain;
- means for calculating an error indicator corresponding to the modulus of the transformed signal, the error indicator being indicative of the modulation error;
- means for calculating a compensation, to be applied to the test signals for counterbalancing the modulation error, according to the error indicator,
- means for applying said compensation to the test signals, and
- means for storing an indication of the compensation for the application of the compensation to each pair of two operative signals managed by the telecommunication transmitter apparatus during operation thereof.

15. A transmitter apparatus including a calibration system for reducing modulation errors, the calibration system including:
- a test generator for generating a pair of test signals, the test signal being substantially in quadrature to each other;
- a modulator for generating a modulated signal by modulating the test signals, the modulation introducing a modulation error;
- a non-linear quadratic block for obtaining a squared signal corresponding to the square of the modulated signal;
- an estimator for calculating:
  - a transformed signal corresponding to the squared signal in the frequency domain,
  - an error indicator corresponding to the modulus of the transformed signal, the error indicator being indicative of the modulation error, and
  - a compensation, to be applied to the test signals for counterbalancing the modulation error, according to the error indication;
- a compensator for applying said compensation to the test signals, and
- a memory for storing an indication of the compensation for the application of the compensation to each pair of operative signals managed by the telecommunication transmitter apparatus during operation thereof.

16. The transmitter apparatus of claim 15, wherein the modulator is an Orthogonal Frequency Division Multiplexing modulator.

* * * * *